US009025722B1

(12) United States Patent
Shaber et al.

(10) Patent No.: US 9,025,722 B1
(45) Date of Patent: May 5, 2015

(54) METHOD AND DEVICE FOR FABRICATING DISPERSION FUEL COMPRISING FISSION PRODUCT COLLECTION SPACES

(75) Inventors: Eric L. Shaber, Idaho Falls, ID (US); Randall S. Fielding, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 626 days.

(21) Appl. No.: 13/302,150

(22) Filed: Nov. 22, 2011

Related U.S. Application Data (60) Provisional application No. 61/512,988, filed on Jul. 29, 2011.

(51) Int. Cl.
*G21C 3/00* (2006.01)
*G21C 3/58* (2006.01)

(52) U.S. Cl.
CPC ......................................... *G21C 3/58* (2013.01)

(58) Field of Classification Search
CPC .............. G21C 3/42; G21C 3/58; G21C 3/60; G21C 3/62; G21C 3/623; G21C 3/626; G21C 3/64
USPC .................. 376/409, 411, 412, 455
See application file for complete search history.

(56) References Cited

U.S. PATENT DOCUMENTS

| 4,432,933 A * | 2/1984 | Teitel et al. .................. 376/152 |
| 2007/0263762 A1* | 11/2007 | Kuczynski .................... 376/457 |

OTHER PUBLICATIONS

NL/CON-10-19000 Preprint a Study of Fast Reactor Fuel Transmutation in a Candidate Dispersion Fuel Design.
NL/EXT-10-19999 Options Study Documenting the Fast Reactor Fuels Innovative Design Activity.

* cited by examiner

*Primary Examiner* — Jack W Keith
*Assistant Examiner* — Marshall O'Connor
(74) *Attorney, Agent, or Firm* — Michael J. Dobbs; Daniel D. Park; John T. Lucas (57) ABSTRACT

A method of fabricating a nuclear fuel comprising a fissile material, one or more hollow microballoons, a phenolic resin, and metal matrix. The fissile material, phenolic resin and the one or more hollow microballoons are combined. The combined fissile material, phenolic resin and the hollow microballoons are heated sufficiently to form at least some fissile material carbides creating a nuclear fuel particle. The resulting nuclear fuel particle comprises one or more fission product collection spaces.
In a preferred embodiment, the fissile material, phenolic resin and the one or more hollow microballoons are combined by forming the fissile material into microspheres. The fissile material microspheres are then overcoated with the phenolic resin and microballoon. In another preferred embodiment, the fissile material, phenolic resin and the one or more hollow microballoons are combined by overcoating the microballoon with the fissile material, and phenolic resin.

20 Claims, 6 Drawing Sheets

METHOD AND DEVICE FOR FABRICATING DISPERSION FUEL COMPRISING FISSION PRODUCT COLLECTION SPACES

CROSS-REFERENCE TO RELATED APPLICATIONS

This application claims priority to U.S. provisional patent application 61/512,988, filed Jul. 29, 2011, hereby fully incorporated by reference.

GOVERNMENT INTERESTS

The United States Government has rights in this invention pursuant to Contract No. DE-AC07-051D14517, between the U.S. Department of Energy (DOE) and Contractor.

FIELD OF THE INVENTION

The present invention relates to nuclear fuel and to methods for fabricating the same.

BACKGROUND OF THE INVENTION

Traditional reactor fuel efficiencies are limited by design. In traditional reactors, neutrons interact with the fissile material creating fission-products that cannot be transmuted. This expedites fission product buildup and causes swelling. Consequently, substantial fission product poisoning negatively affects nuclear fuel longevity and efficiency.

Compared to traditional reactors, fast reactors are more immune to fission product poisoning. The fission-products created can be further transmuted, using more fuel, more efficiently. However, more fission-products and helium gas are created due to the increased number of transmutations that occur. Additionally, the extra fission-products and fission gases cause fuel swelling because current fuel designs cannot accommodate fission product buildup within the fuel. This causes accelerated damage of the nuclear fuel and cladding due to the excessive swelling.

Therefore, there is a need for a nuclear fuel, and a process for fabricating it, that limits fuel swelling by accommodating fission-products and gases, and, as a result, facilitating higher burnup rates.

SUMMARY OF THE INVENTION

A method of fabricating a nuclear fuel comprising providing a fissile material, one or more hollow microballoons, and a phenolic resin. The one or more hollow microballoons comprising carbon. The fissile material, phenolic resin and the one or more hollow microballoons are combined. The combined fissile material, phenolic resin and the one or more hollow microballoons are heated sufficiently to form at least some fissile material carbides creating a nuclear fuel particle. The resulting nuclear fuel particle comprises one or more fission product collection spaces.

In a preferred embodiment, the fissile material, phenolic resin and the one or more hollow microballoons are combined by forming the fissile material into microspheres. The fissile material microspheres are then overcoated with a microballoon mixture of the phenolic resin and microballoons. In another preferred embodiment, the fissile material, phenolic resin and the one or more hollow microballoons are combined by particle spheronization. In an another preferred embodiment the microballoons and phenolic resin are spheronized and then overcoated with the fissile material.

DETAILED DESCRIPTION OF THE INVENTION

A method of fabricating a nuclear fuel comprising providing a fissile material, one or more hollow microballoons, and a phenolic resin. The one or more hollow microballoons comprising carbon. The fissile material, phenolic resin and the one or more hollow microballoons are combined. The combined fissile material, phenolic resin and the one or more hollow microballoons are heated sufficiently to form at least some fissile material carbides creating a nuclear fuel particle. The resulting nuclear fuel particle comprises one or more fission product collection spaces.

In a preferred embodiment, the fissile material, phenolic resin and the one or more hollow microballoons are combined by forming the fissile material into microspheres. The fissile material microspheres are then overcoated with a microballoon mixture of the phenolic resin and microballoon. In another preferred embodiment, the fissile material, phenolic resin and the one or more hollow microballoons are combined by spheronizing the microballoons and phenolic resin and then overcoating with the fissile material. In another preferred embodiment, the fissile material, phenolic resin and the one or more hollow microballoons are all combined by spheronizing the mixture.

Fissile Material

Fissile material comprises any fissile, or combination of fissile materials, that is capable of undergoing fission or is fissionable. The fissile material preferably comprises transuranics including, but not limited to: U metal, $UO_2$, UN, UC, Pu metal, and $PuO_2$, or a combination thereof. In a preferred embodiment, the fissile material is a fissile material oxide. Preferably, the fissile material is eventually thermally treated in a carbothermic reduction of the oxide to form fissile material carbides.

Preferably, the fissile material is melted and electrochemically separated to remove residual salts, or dissolved and aqueously separated to remove fission products and undesirable elements. In a preferred embodiment, the fissile material is first atomized into solid microspheres. Preferably, the fissile material is gelation precipitated, formed using the Wurster Process, atomized by shot tower, gas atomization, or rotating electrode atomization, or spheronized from powder. Preferably, the solid microspheres of fissile material have a representative diameter between approximately 2-500 microns. A representative diameter is the average distance across a cross-section of any shape, for example cubes, cuboids, spheres, cylinders, cone, triangular prism, hexagonal prism, square-based pyramid, hexagonal pyramid, spheroids, etc,

One or More Hollow Microballoons

The one or more hollow microballoons each comprises a hollow shell. The shell of each microballon comprises carbon. Preferably, each hollow microballon has a representative diameter of approximately 2 to 60 μm and a spherical or spheroid geometry. Preferably, each hollow microballon has a partial vacuum. In one preferred embodiment, each hollow microballoons has a tap density of approximately 0.146 g/cm$^3$ or approximately 6% of the density of graphite. In another preferred embodiment, each hollow microballon has a tap density of approximately 0.265 g/cm$^3$ or approximately 12% of the density of graphite.

In one preferred embodiment, the one or more hollow microballoons are made using the method discussed in U.S. Pat. No. 7,749,456, hereby fully incorporated by reference. Briefly, in this embodiment, a cured phenolic resin microballoon is heated using a heat dissipation reactor in a furnace. The phenolic resin microballoons are preferably carbonized by subjecting the phenolic resin microballoons to a stepped heating cycle that incrementally heats the phenolic resin microballoons over several hours, and then cools the phenolic resin microballoons over several hours until the phenolic resin microballoons are completely converted into carbon microballoons.

The resulting one or more hollow microballoons are then preferably sized using a cyclone separation. Preferably, the one or more hollow microballoons are thermally treated to over 2,400° C. in a vacuum.

Phenolic Resin

The Phenolic resin is capable of bonding with the fissile material and the one or more microballoons. The phenolic resin is preferably a synthetic thermosetting resin such as obtained by the reaction of hydroxybenzine with formaldehyde. Preferably, the phenolic resin is formed by a step-growth polymerization reaction that can be either acid-catalyzed or alkaline-catalyzed. Preferably, the phenolic resin is cured sufficiently to remove volatile organic and preferably from the resin and preferably form the resin into a glassy carbon structure. In a preferred embodiment, the phenolic resin is an acid catalyzed resin using Hexamethylenetetramine as the hardening agent (formaldehyde donor).

The Combination of Fissile Material, Phenolic Resin and the One or More Microballoons The fissile material, phenolic resin and one or more microballoons are combined, preferably into a plurality of granules. In a preferred embodiment, the combination of fissile material, phenolic resin and one or more microballoons is combined by overcoating one or more of the fissile material, phenolic resin and microballoons using a process such as the GRANUREX process trademarked by VECTOR Corporation. In this process, the interior of a conical rotor chamber is maintained at a slight vacuum, and pressurized air is allowed to flow around the interior to fluidize the starting particles. The coating particles are also vacuum inducted into the interior of the conical chamber, thereby coating the particles. In one embodiment, the microballoons are overcoated with a fissile matrix of the resin and fissile material. More preferably, fissile material granules are overcoated with a microballon mixture of the resin and microballoons.

Preferably, the combination of fissile material, phenolic resin and the one or more hollow microballoons has excess carbon, thereby enhancing the production of fissile carbides during heating.

Heating the Combination of the Phenolic Resin and the Microballons

The combined fissile material, phenolic resin and the one or more hollow microballoons are heated sufficiently to form at least some fissile material carbides creating a nuclear fuel particle with one or more fission product collection spaces. Preferably, the combined fissile material, phenolic resin and the one or more hollow microballoons are heated to a temperature greater than 1,400° C. to form fissile material carbides. In a preferred embodiment, the heating is conducted in a vacuum, soaking the agglomerated microballoons and fissile material at approximately 1,800° C. for four hours or until complete bonding between the one or more microballoons and fissile material has occurred for densification. In a preferred embodiment the one or more microballoons form a bonded honeycomb structure when the carbon from the phenolic resin reacts with the fissile material. Preferably, the resulting nuclear fuel particle is substantially carbides of the fissile material. Preferably, the resin is cured at a temperature up to 200° C., thereby holding the nuclear fuel particle together during any future carbonization and heat treatments of the nuclear fuel particle. In a preferred embodiment, the resin is an uncured, solid powder during overcoating, heated to a viscous liquid and then cured at a temperature up to 200° C., thereby holding the nuclear fuel particle together during any future carbonization and heat treatments of the nuclear fuel particle.

One or More Fission Product Collection Spaces

The one or more fission product collection spaces are capable of capturing fission products during the fission of the nuclear fuel particle. Preferably, the one or more fission product collection spaces are generated from the one or more hollow microballoons. Preferably, the one or more hollow microballoons are heated in the fissile material thereby creating voids. In one preferred embodiment, the one or more fission product collection spaces are voids generated from heating and reacting the one or more hollow microspheres and glassy carbon from the resin with the fissile material, preferably generating fissile material carbides. The one or more fission product collection spaces reduce fuel swelling that compromises nuclear fuel particle cladding integrity. As the internal pressure of the fuel increases as the buildup of solid and gaseous fission-products occurs, the fission-products are isolated from the fuel in the fission product collection spaces, eliminating fuel swelling. Consequently, damage due to fuel swelling to any surrounding cladding at the fuel interface due to swelling is reduced, or more preferably eliminated. Fabricating fuel with fission product collection spaces substantially reduces the risk of a breach of the cladding, lengthens the life of the nuclear fuel particle and increases efficiency.

The fission product collection spaces prevent the corrosion and swelling of the resulting nuclear fuel particle by isolating fission-products away from any fuel cladding. In addition, because the fission product collection spaces are contained within the nuclear fuel particle, the need for plenum space at either end of the fuel rod is eliminated. Eliminating the need for plenum space at either end of the fuel rod shortens the length of the fuel rod or allows for more fuel to be used in one fuel rod. Additionally, because the fission-products are fully contained within the one or more fission product collection spaces of nuclear fuel particle, one more barrier is added to the physical barriers that prevent the escape of the fission-products in case of a reactor breach. Preferably, the fission product collection spaces account for greater than 5%, but less than 50% of the resulting fuel particle by volume.

Metal Matrix

Preferably, the resulting combination of fissile material, phenolic resin, and microballon is overcoated with a metal, preferably a powder, forming a metal matrix. In a preferred embodiment, the resulting combination of fissile material, phenolic resin, and microballon is overcoated with Zirconium (Zr), Titanium (Ti), Niobium (Nb), Ferritic or marensitic chromium steel (based on HT-9 or Mod 9Cr-1 Mo), ODS powder, Intermetallics (e.g., NiAl3), or a combination thereof.

In a preferred embodiment, the resulting combination of fissile material, phenolic resin, and microballon is overcoated with zirconium, as zirconium materials have good neutronics characteristics, irradiation behavior with alpha microstructure, high temperature strength. The broad working range of temperatures of zirconium makes it a preferred candidate to be coupled with other metals, allowing a greater variety of materials to be used for nuclear fuel particles.

In another preferred embodiment, the resulting combination of fissile material, phenolic resin, and microballon is overcoated with titanium materials as they have good high temperature properties and formability characteristics. Titanium is also fully miscible with zirconium, niobium, and tantalum (Ta).

In yet another preferred embodiment, the resulting combination of fissile material, phenolic resin, and microballon is overcoated with niobium materials, as they have high melting points with good high temperature properties.

Fuel Rods

A plurality of the nuclear fuel particle formed using one of the discussed methods herein is preferably compacted and extruded forming one or more fuel rods. Preferably, a plurality of the nuclear fuel particle formed using one of the discussed methods herein is preferably compacted and extruded forming one or more fuel rods at a temperature at least approximately 1,100° C., but less than the reaction temperature of the particles, preferably less than approximately 1,400° C.

Preferably, the resulting fuel has a fissile material by volume fraction optimized for extrusion and the resulting rod fuel density, depending on various factors, for example, matrix metal, extrusion temperature, sodium bond barrier (if used), fissile material, cladding used etc. Preferably, the resulting fuel has less than approximately 30% fissile material by volume fraction, more preferably approximately 10 percent. The fuel rods are formed after the nuclear fuel particle is heated sufficiently to form at least some fissile material carbides, thereby maintaining the fission product collection spaces during the formation of the fuel rods.

Fuel Cladding

In a preferred embodiment, one or more fuel rods formed using one of the above discussed methods, is encapsulated in a cladding. The cladding is preferably made of zirconium alloy. Preferably, the cladding is metallurgically bonded or sodium bonded with the fuel rod. Preferably, the fuel rods are cooled after they are formed and subsequently heated for alignment of microstructures of the, at a temperature less than the reaction temperature of the particles, more preferably less than approximately 1400° C.

FIG. 1

Figure 1:
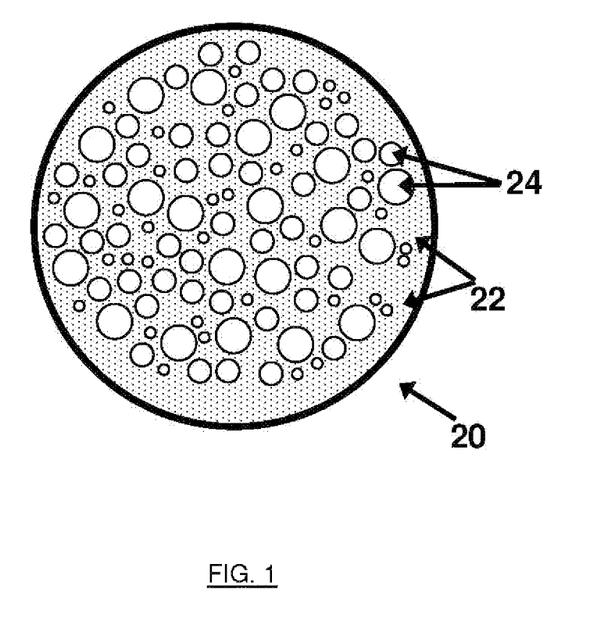
FIG. 1 shows a cross sectional view of one embodiment of a fabricated nuclear fuel particle comprising fission product collection spaces.

FIG. 1 shows a cross sectional view of one embodiment of a fabricated nuclear fuel particle comprising fission product collection spaces. The nuclear fuel particle 20 comprises fissile material 22, and one or more fission product collection space 24. A plurality of fission product collection spaces 24 are depicted in FIG. 1; however, any number, including a single fission product collection space 24 may be used.

Fission Product Collection Spaces 24

Each fission product collection space 24 is defined within the fissile material 22 and each fission product collection space 24 is capable of capturing fission-products produced from the fissions of the fissile material 22. In a preferred embodiment, the nuclear fuel particle 20 will have less than approximately 50 vol % fission-collection space 24 content.

In one preferred embodiment, each fission product collection space 24 comprises a partial vacuum. In another preferred embodiment, when the fission product collection spaces 24 are created in a fluidized bed of a partial pressure, the fission product collection spaces 24 comprise fluidizing gas.

The fission product collection spaces 24 are distinctly separate and from each other and are not connected to each other. Preferably, the location of the fission products collection spaces 24 is optimized for use in a nuclear reactor, preferably by distributing the fission product collection spaces 24 evenly across the nuclear fuel particle 20. Preferably, the fission product collection spaces 24 are spheroid in shape, including, but not limited to, both spheroids (ovals) and spheres (circles).

Additionally, because the fission product collection spaces 24 are incorporated into the nuclear fuel particle 20 design, less fissile material 22 is necessary for fabrication of the nuclear fuel particle 20. This allows higher fuel fissile densities to be used when fabricating the nuclear fuel particle 20, and, higher burn-up efficiency is achieved because burn-up is limited to using the fissile material 22. The simplified composition of the nuclear fuel particle 20 not only allows for simplified manufacture but also allows the nuclear fuel particle 20 to be readily separated for fuel recycle.

Figure 2A:
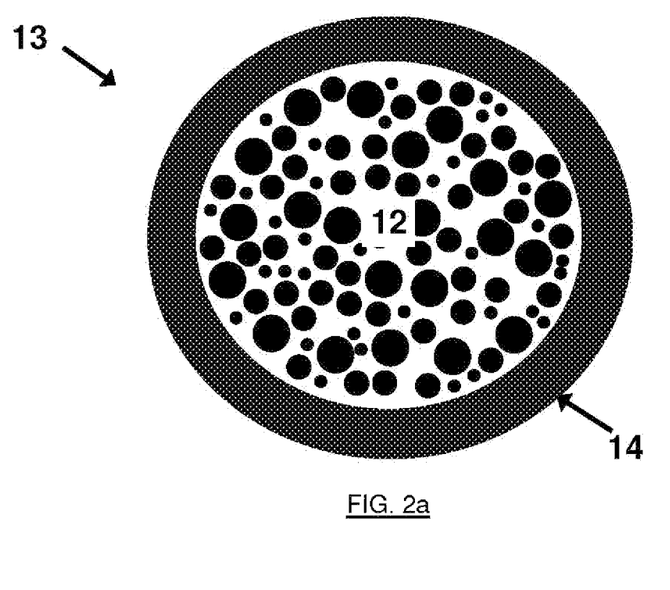
FIG. 2a shows a cross sectional view of one preferred embodiment of a combination of fissile material and one or more microballoons, by overcoating one or more microballoons with fissile material.
Figure 2B:
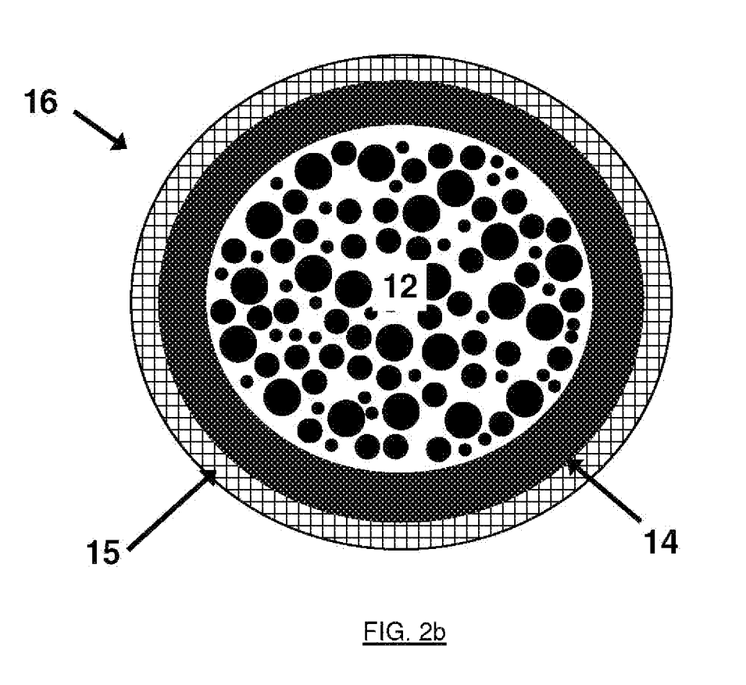
FIG. 2b shows a cross sectional view of one preferred embodiment of a combination of fissile material and one or more microballoons, by overcoating one or more microballoons with fissile material, and then overcoated with a metal matrix.

FIG. 2a and FIG. 2b

In a preferred embodiment, shown in FIG. 2a, the fissile material, phenolic resin and the one or more hollow microballoons are combined by overcoating one or more microballoons 12 with a fissile material mixture 14 of fissile material and phenolic resin creating a nuclear fuel particle 13. Although, a plurality of microballoons are shown in FIG. 2a, any number may be used, including a single microballon. Preferably, a plurality of the nuclear fuel particle 13 is combined and formed into one or more fuel rods. In a preferred embodiment, the nuclear fuel particle 13 has a range in representative diameter from approximately 200 to 1,000 µm.

FIG. 2b shows a cross sectional view of one preferred embodiment of a combination of fissile material and one or more microballoons, by overcoating one or more microballoons with fissile material, and then overcoated with a metal matrix mixture 15 of metal and a phenolic resin. In this embodiment, the nuclear fuel particle 13 described in FIG. 2a, is overcoated with a metal and a phenolic resin, preferably a novolac resin, creating a nuclear fuel particle with a metal matrix precursor. The nuclear fuel particle with a metal matrix precursor is then preferably heated sufficiently to cure and carbonize the novolac resin, react the fuel material to form a carbide, and react the carbon with the metal matrix precursor, creating a nuclear fuel carbide particle with a metal matrix carbide shell 16.

Figure 3A:
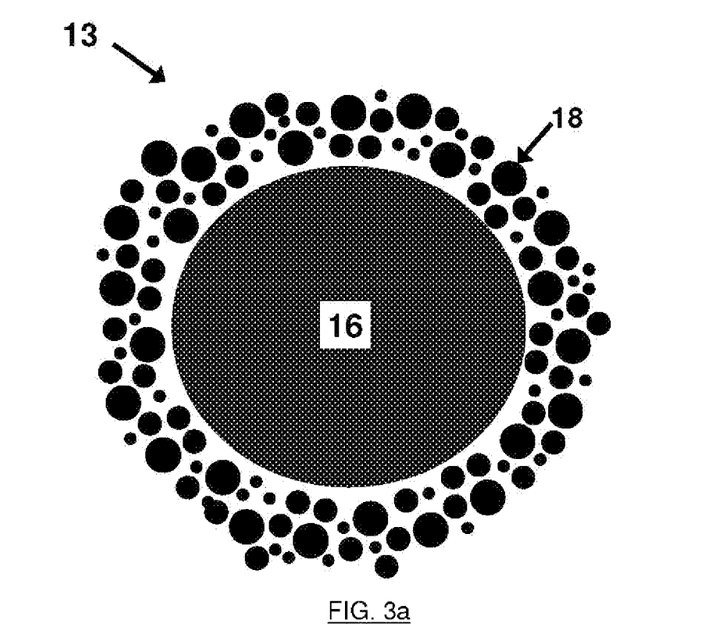
FIG. 3a shows a cross sectional view of one preferred embodiment of a combination of fissile material and one or more microballoons, by overcoating fissile material with microballoons.
Figure 3B:
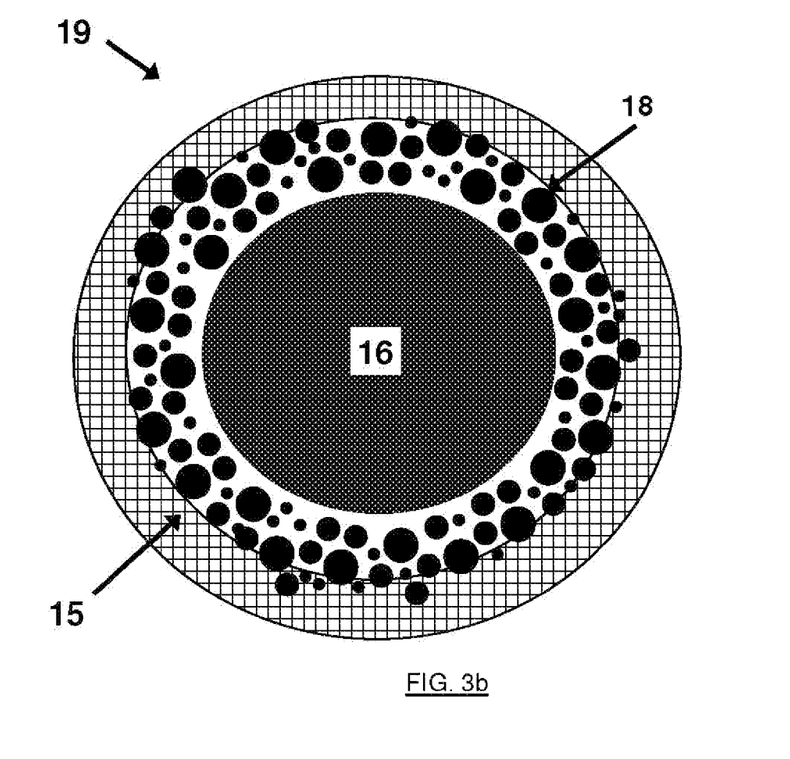
FIG. 3b shows a cross sectional view of one preferred embodiment of a combination of fissile material and one or more microballoons, by overcoating fissile material with microballoons, and then overcoated with a metal matrix.

FIG. 3a and FIG. 3b

In another preferred embodiment, show in FIG. 3a, the fissile material, phenolic resin and the one or more hollow microballoons are combined by forming the fissile material into microspheres 16. Preferably, the fissile material is formed into spheres using the Wurster Process or gel precipitation. Preferably, the fissile material is thermally treated, thereby creating fissile material oxides or carbides, to harden the material before overcoating. The fissile material microspheres 16 are then overcoated with a microballon mixture 18 of the phenolic resin and microballoon and thermally treated creating a nuclear fuel carbide particle 13. Preferably, a plurality of the nuclear fuel particle 13 is combined and formed into one or more fuel rods. In a preferred embodiment, the nuclear fuel particle 13 has a range in representative diameter from approximately 200 to 1,000 µm.

FIG. 3b shows a cross sectional view of one preferred embodiment of a combination of fissile material and one or more microballoons, by overcoating fissile material with a microballoon mixture 18 of the phenolic resin and a microballoons, and then overcoated with a metal matrix. In this embodiment, the nuclear fuel particle 16 as described in FIG. 3a, is overcoated with a metal matrix mixture 15 of metal and a phenolic resin, preferably a novolac resin, creating a nuclear fuel particle with a metal matrix precursor. The nuclear fuel particle with a metal matrix precursor is then heated sufficiently to cure and carbonize the novolac resin, and form a matrix metal carbide creating a nuclear fuel carbide particle with a metal matrix carbide shell 19.

Figure 4A:
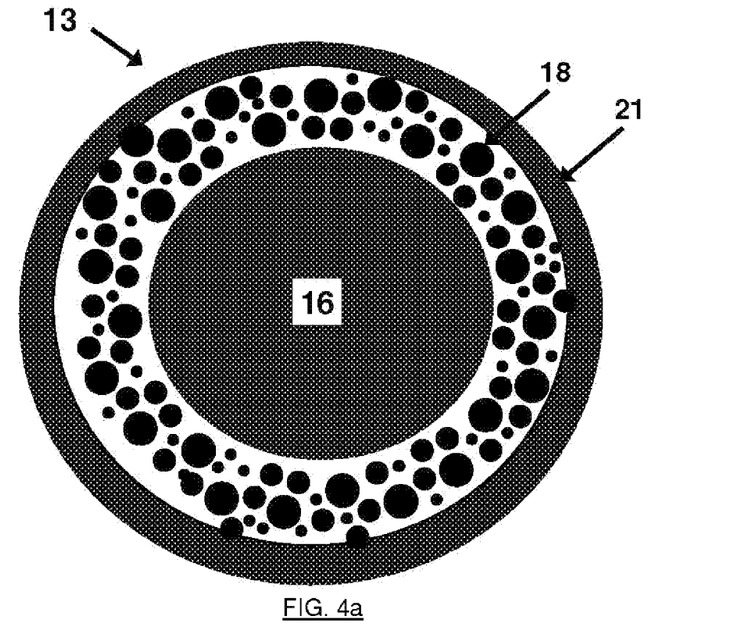
FIG. 4a shows a cross sectional view of one preferred embodiment of a combination of fissile material and one or more microballoons, by overcoating fissile material with microballoons, and again with fissile material.
Figure 4B:
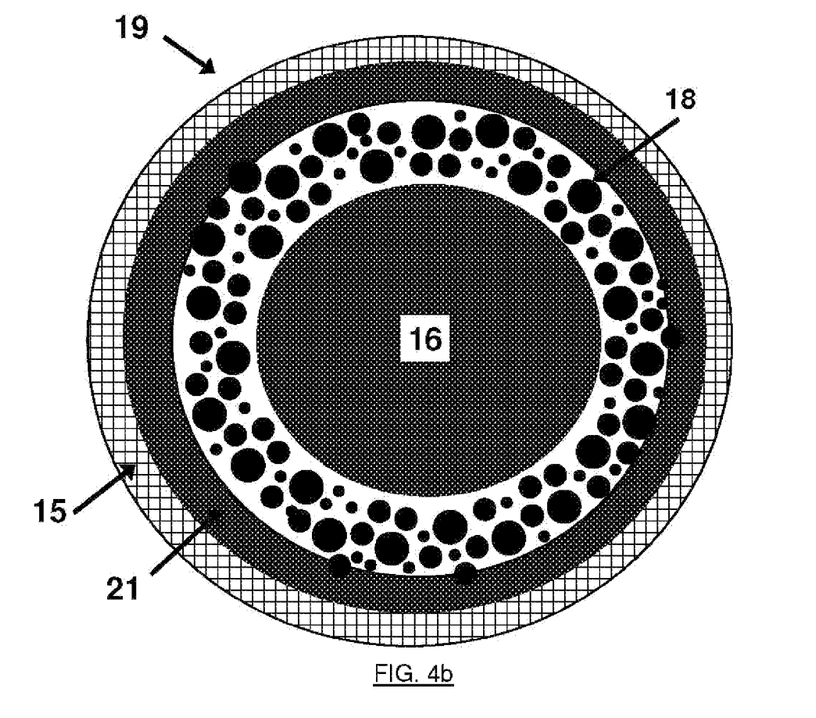
FIG. 4b shows a cross sectional view of one preferred embodiment of a combination of fissile material and one or more microballoons, by overcoating fissile material with a microballoons, again with fissile material, and then overcoating with a metal matrix.

FIG. 4a and FIG. 4b

FIG. 4a shows a cross sectional view of one preferred embodiment of a combination of fissile material and one or more microballoons, by overcoating fissile material with a microballoons, and again with fissile material. In this embodiment, the fissile material, phenolic resin and the one or more hollow microballoons are combined by forming the fissile material into microspheres 16. Preferably, the fissile material is formed into spheres using the Wurster Process or gel precipitation. Preferably, the fissile material is thermally treated, thereby creating fissile material oxides or carbides, to harden the material before overcoating. The fissile material microspheres 16 are then overcoated with a microballoon mixture 18 of phenolic resin and one or more microballoons. The fissile material microspheres 16 overcoated with the microballoon mixture 18 of the phenolic resin and microballon is then overcoated again with a fissile material mixture 16 of fissile material and phenolic resin creating a nuclear fuel particle 13. Preferably, the nuclear fuel particle 13 is thermally treated to harden the material and form a fuel carbide particle. Preferably, a plurality of the nuclear fuel particle 13 is combined and formed into one or more fuel rods. In a preferred embodiment, the nuclear fuel particle 13 has a range in representative diameter from approximately 200 to 1,000 µm.

FIG. 4b shows a cross sectional view of one preferred embodiment of a combination of fissile material and one or more microballoons, by overcoating fissile material with a microballoons, again with fissile material, and then overcoated with a metal matrix. In this embodiment, the nuclear fuel particle 13 as described in FIG. 4a, is overcoated with a metal matrix mixture 15 of metal and a phenolic resin, creating a nuclear fuel particle with a metal matrix precursor shell. The nuclear fuel particle in the metal matrix precursor is then heated sufficiently to cure and carbonize the novolac resin, and form both fuel and metal matrix carbides creating a nuclear fuel carbide particle with a metal matrix carbide shell 19.

Figure 5:
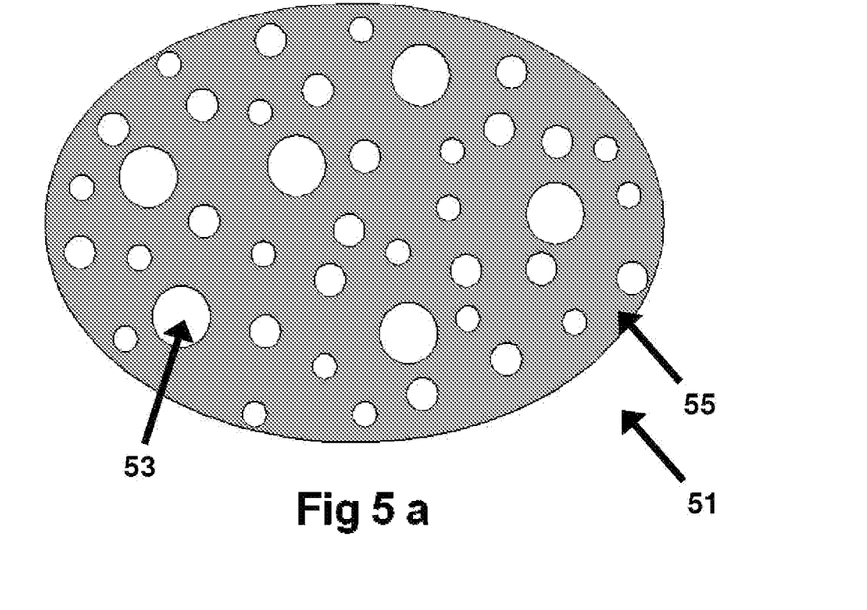
FIG. 5a shows a cross sectional view of one preferred embodiment of a combination of fissile material and one or more microballoons, by spheronization of a mixture of fissile material, microballoons, and phenolic resin.
FIG. 5b shows a cross sectional view of one preferred embodiment of a combination of fissile material and one or more microballoons, by spheronization of a mixture of fissile material, microballoons, and phenolic resin and then overcoated with a metal matrix.

FIG. 5a and FIG. 5b

FIG. 5a shows a cross sectional view of one preferred embodiment of a combination of fissile material, microballoon, and phenolic resin. In this embodiment, the fissile material, microballoon, and phenolic resin are pre-mixed, then spheronized. The fissile material, microballoon, and phenolic resin may be spheronized using any processes whereby the fissile material, microballoon, and phenolic resins are combined forming one or more spheroidal agglomerates 51. In a preferred embodiment, the fissile material, microballoon, and phenolic resin are spheronized using the GRANUREX process trademarked by VECTOR Corporation to form one or more spheroidal agglomerates 51. The one or more spheroidal agglomerates 51 are then cured and carbonized to remove volatile organic from the resin, then thermally treated to form a fissile carbides around microballoons.

As shown in FIG. 5a, each spheroidal agglomerate 51 comprises one or more microballoons 53 agglomerated with a fissile material mixture 55 of fissile material and phenolic resin.

FIG. 5b shows a cross sectional view of one preferred embodiment of a combination of fissile material and one or more microballoons, by overcoating each spheroidal agglomerate 51 of FIG. 5a, with a metal matrix. In this embodiment, each spheroidal agglomerate 51 as described in FIG. 5a, is overcoated with a metal matrix of a metal and a phenolic resin, preferably a novolac resin, creating a spheroidal agglomerate with a metal matrix precursor shell. The nuclear fuel particle in the metal matrix precursor is then heated sufficiently to cure and carbonize the novolac resin, and form both fuel and metal matrix carbides creating spheroidal agglomerate with a metal matrix carbide shell 57.

FIG. 6

Figure 6:
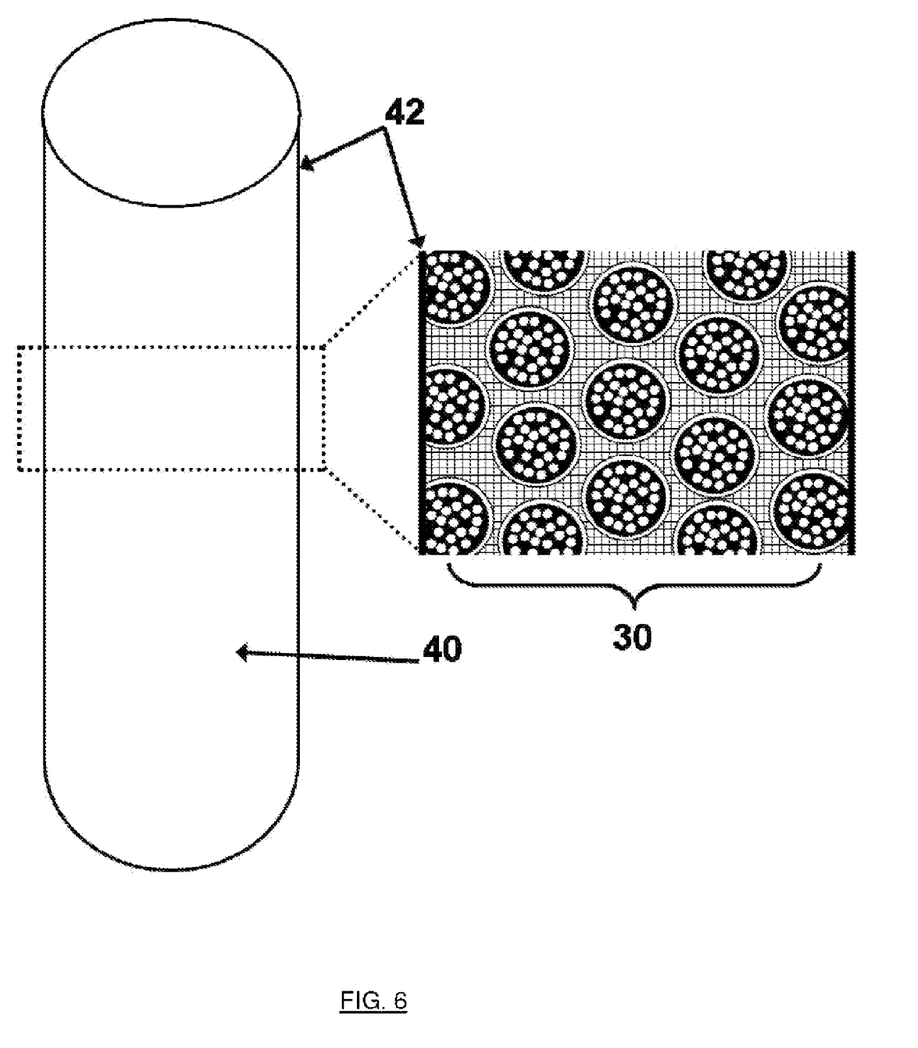
FIG. 6 shows a preferred embodiment of a nuclear fuel particle rod comprising a plurality of nuclear fuel particle particles.

FIG. 6 shows a preferred embodiment of a nuclear fuel rod comprising a plurality of nuclear fuel particles. FIG. 6 shows a preferred embodiment of a nuclear fuel rod 40 that comprising a plurality of nuclear fuel particles 30 each comprising one or more fission product collection spaces as described above. The plurality of nuclear fuel particles 30 are mixed with a metal matrix, compacted, extruded to fuel core dimensions, sheared to core lengths, encapsulated in fuel cladding, and finished with a sodium bond. In a preferred embodiment the plurality of nuclear fuel particles 30 are extruded to form one or more fuel rods 40. The one or more fuel rods 40 are preferably chemically cleaned to remove any exposed fuel from the sectioned ends, and then enclosed in a cladding 42. The cladding 42 ends are preferably welded closed.

Preferably, the fuel rods are cooled after they are formed and subsequently heated for alignment of microstructures of the cladding, at a temperature less than the reaction temperature of the particles, more preferably less than approximately 1,400° C.

Fuel Rod Coextrusion with a Metal Matrix

In one preferred embodiment, a plurality of nuclear particles 30 is mixed with a metal matrix forming a metal/particle matrix. Preferably, the metal/particle matrix is combined in a preformed canister. In a preferred embodiment, the metal comprises zirconium (Zr), titanium (Ti), niobium (Nb), and the preformed canister comprises zirconium alloy, ferritic or marensitic chromium steel (based on HT-9 or Mod 9Cr-1 Mo), or an ODS alloy. The plurality of nuclear fuel particles 30 mixed with a metal are preferably compacted in the preformed canister, the can is seal welded in vacuum, and enclosed in copper and a lubricant. Preferably, the plurality of nuclear fuel particles 30 mixed with a metal is coextruded and sectioned into one or more fuel rods 40. The one or more fuel rods 40 are preferably chemically cleaned to remove any exposed fuel from the sectioned ends, encapsulated in fuel cladding and finished with a sodium bond.

Preferably, the fuel rods are cooled after they are formed and subsequently heated for alignment of microstructures of the cladding and metal matrix, at a temperature less than the reaction temperature of the particles, more preferably less than approximately 1,400° C.

Fuel Rod Coextrusion with Cladding with a Metal Matrix

In one embodiment, a plurality of nuclear particles 30 is mixed with a metal forming a metal matrix. Preferably, the metal/particle matrix is combined in a preformed canister. In a preferred embodiment, the metal comprises Zirconium (Zr), Titanium (Ti), Niobium (Nb), and the preformed canister is zirconium alloy, ferritic or marensitic chromium steel (based on HT-9 or Mod 9Cr-1 Mo), or an ODS alloy. The plurality of nuclear fuel particles 30 mixed with a metal are coextruded with the cladding material to form one or more fuel rods 40. In this embodiment, the plurality of plurality of nuclear fuel particles 30 mixed with a metal are compacted in a cladding 42 preform can, the can is seal welded in vacuum, and enclosed in copper and a lubricant. Then the plurality of nuclear fuel particles 30 mixed with a metal are coextruded and sectioned into one or more fuel rods 40. The one or more fuel rods 40 are each chemically cleaned to remove the copper and any exposed fissile material from the sectioned ends, and then the ends are hot swaged in preparation for the end cap. Preferably, hot swaging is completed by a tool that heats and deforms the end of each fuel rod 40, locally reducing the fuel rod diameter. After another chemical cleaning, end caps are brazed and welded, resistance welded, or friction-welded to each end of the fuel rods 40 to provide a fully hermetic fuel rod that prevents all attack of the fuel particles by reactor coolant.

Preferably, the fuel rods are cooled after they are formed and subsequently heated for alignment of microstructures of the cladding and metal matrix, at a temperature less than the reaction temperature of the particles, more preferably less than approximately 1,400° C.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C.§112, ¶ 6. In particular, the use of "step of" in the claims herein is not intended to invoke the provisions of 35 U.S.C.§112, ¶ 6.

We claim:

1. A method of fabricating a nuclear fuel comprising:
   a) providing a fissile material;
   b) providing a plurality of hollow microballoons each microballoon comprising carbon;
   c) providing a phenolic resin; and
   d) combining said fissile material, said phenolic resin, and said microballoons; and
   e) heating said combination sufficiently to form at least some fissile material carbides creating a nuclear fuel particle comprising fission product collection spaces formed from the hollow core of each said microballoon.

2. The method of fabricating a nuclear fuel of claim 1 whereby:
   a) said step of combining said fissile material, said phenolic resin, and said microballoons comprises:
      i. forming said fissile material into microspheres;
      ii. heating said fissile material microspheres sufficiently to form at least some fissile material carbides of said microspheres; and
      iii. overcoating said fissile material microspheres with a microballoon mixture of said phenolic resin, and said microballoons.

3. The method of fabricating a nuclear fuel of claim 1 whereby:

a) said step of combining said fissile material, said phenolic resin, and said microballoons comprises:
   i. spheronizing said fissile material, said phenolic resin, and said microballoons into a spheroidal particle.

4. The method of fabricating a nuclear fuel of claim 1 whereby:
   a) said step of combining said fissile material, said phenolic resin and said microballoons comprises:
      i. overcoating said microballoons with a fissile material mixture of said phenolic resin and said fissile material.

5. The method of fabricating a nuclear fuel of claim 1 further comprising:
   a) mixing said nuclear fuel particle with a metal creating a nuclear fuel particle with a metal matrix; and
   b) compacting and extruding a plurality of said nuclear fuel particle with a metal matrix forming one or more fuel rods.

6. The method of fabricating a nuclear fuel of claim 1 further comprising:
   a) overcoating said nuclear fuel particle with a metal mixture of a metal and a phenolic resin creating a nuclear fuel particle with a metal matrix precursor;
   b) heating said nuclear fuel particle with a metal matrix precursor sufficiently to cure and carbonize said phenolic resin and form metal carbide creating a nuclear fuel carbide particle with a metal matrix carbide shell; and
   c) compacting and extruding said nuclear fuel carbide particle with a metal matrix carbide shell forming one or more fuel rods.

7. The method of fabricating a nuclear fuel of claim 6 further comprising:
   a) heating said one or more fuel rods sufficiently to react metal in said nuclear fuel particle in a matrix with the fissile material in said nuclear fuel particle with a metal matrix forming at least some fissile material carbides creating a nuclear carbide fuel with a metal matrix.

8. The method of fabricating a nuclear fuel of claim 6 further comprising:
   a) said metal selected from the group of metal consisting of: Zr, Ti, Nb and combinations thereof.

9. The method of fabricating a nuclear fuel of claim 1 further comprising:
   a) said hollow microballoons comprising a representative diameter between 1 and 60 microns.

10. The method of fabricating a nuclear fuel of claim 1 further comprising:
    a) said hollow microballoons comprising a representative diameter between 1 and 10 microns.

11. The method of fabricating a nuclear fuel of claim 1 further comprising:
    a) said fissile material comprising a representative diameter between 2 to 500 microns.

12. The method of fabricating a nuclear fuel of claim 1 whereby:
    a) said step of combining said fissile material, said phenolic resin, and said microballoons comprises:
       i. forming said fissile material into microspheres;
       ii. heating said fissile material microspheres sufficiently to form at least some fissile material carbides of said microspheres; and
       iii. overcoating said heated fissile material microspheres with a microballoon mixture of said phenolic resin, and said microballoons.

13. The method of fabricating a nuclear fuel of claim 12 further comprising:
    a) overcoating said nuclear fuel particle with a metal mixture of a metal and a phenolic resin creating a nuclear fuel particle with a metal matrix precursor;
    b) heating said nuclear fuel particle with a metal matrix precursor sufficiently to cure and carbonize said phenolic resin and form metal carbide creating a nuclear fuel carbide particle with a metal matrix carbide shell;
    c) compacting and extruding one or more of said nuclear fuel particle with a metal matrix forming one or more fuel rods at a temperature at least approximately 1,100° C. and less than approximately 1,400° C.;
    d) cooling said one or more fuel rods;
    e) heating said cooled one or more fuel rods;
    f) said metal selected from the group of metal consisting of: Zr, Ti, Nb or a combination thereof;
    g) said hollow microballoons comprising a representative diameter between 1 and 10 microns;
    h) said fissile material comprising a representative diameter between 2 to 500 microns; and
    i) each said one or more fission product collection space at least at a partial vacuum.

14. The method of fabricating a nuclear fuel of claim 13 further comprising:
    a) mixing said nuclear fuel particle with a metal before said step of compacting and extruding said nuclear fuel particle.

15. The method of fabricating a nuclear fuel of claim 1 whereby:
    a) said step of combining said fissile material, said phenolic resin, and said microballoons comprises:
       i. spheronizing said fissile material, said phenolic resin, and said microballoons into a spheroidal particle.

16. The method of fabricating a nuclear fuel of claim 15 further comprising:
    a) overcoating said nuclear fuel particle with a metal mixture of a metal and a phenolic resin creating a nuclear fuel particle with a metal matrix precursor;
    b) heating said nuclear fuel particle with a metal matrix precursor sufficiently to cure and carbonize said phenolic resin and form metal carbide creating a nuclear fuel carbide particle with a metal matrix carbide shell;
    c) compacting and extruding one or more of said nuclear fuel particle with a metal matrix forming one or more fuel rods at a temperature at least approximately 1,100° C. and less than approximately 1,400° C.;
    d) cooling said one or more fuel rods;
    e) heating said cooled one or more fuel rods;
    f) said metal selected from the group of metal consisting of: Zr, Ti, Nb or a combination thereof;
    g) said hollow microballoons comprising a representative diameter between 1 and 10 microns;
    h) said fissile material comprising a representative diameter between 2 to 500 microns; and
    i) each said one or more fission product collection space at least at a partial vacuum.

17. The method of fabricating a nuclear fuel of claim 16 further comprising:
    a) mixing said nuclear fuel particle with a metal before said step of compacting and extruding said nuclear fuel particle.

18. The method of fabricating a nuclear fuel of claim 1 whereby:
    a) said step of combining said fissile material, said phenolic resin and said microballoons comprises:
       i. overcoating said microballoons with a fissile material mixture of said phenolic resin and said fissile material.

19. The method of fabricating a nuclear fuel of claim 18 further comprising:
   a) overcoating said nuclear fuel particle with a metal mixture of a metal and a phenolic resin creating a nuclear fuel particle with a metal matrix precursor;
   b) heating said nuclear fuel particle with a metal matrix precursor sufficiently to cure and carbonize said phenolic resin and form metal carbide creating a nuclear fuel carbide particle with a metal matrix carbide shell;
   c) compacting and extruding one or more of said nuclear fuel particle with a metal matrix forming one or more fuel rods at a temperature at least approximately 1,100° C. and less than approximately 1,400° C.;
   d) cooling said one or more fuel rods;
   e) heating said cooled one or more fuel rods;
   f) said metal selected from the group of metal consisting of: Zr, Ti, Nb or a combination thereof;
   g) said hollow microballoons comprising a representative diameter between 1 and 10 microns;
   h) said fissile material comprising a representative diameter between 2 to 500 microns; and
   i) each said one or more fission product collection space at least at a partial vacuum.

20. The method of fabricating a nuclear fuel of claim 19 further comprising:
   a) mixing said nuclear fuel particle with a metal before said step of compacting and extruding said nuclear fuel particle.

* * * * *